US012071054B2

(12) United States Patent
Kumazaki et al.

(10) Patent No.: US 12,071,054 B2
(45) Date of Patent: Aug. 27, 2024

(54) VEHICLE SEAT (71) Applicants: TOYOTA BOSHOKU KABUSHIKI KAISHA, Aichi (JP); SUMITOMO RIKO COMPANY LIMITED, Aichi (JP)

(72) Inventors: Yoshiyuki Kumazaki, Aichi (JP); Katsuhiko Katagiri, Aichi (JP)

(73) Assignees: TOYOTA BOSHOKU KABUSHIKI KAISHA, Aichi (JP); SUMITOMO RIKO COMPANY LIMITED, Aichi (JP)

(*) Notice: Subject to any disclaimer, the term of this patent is extended or adjusted under 35 U.S.C. 154(b) by 113 days.

(21) Appl. No.: 18/084,187

(22) Filed: Dec. 19, 2022

(65) Prior Publication Data

US 2023/0202364 A1 Jun. 29, 2023

(30) Foreign Application Priority Data

Dec. 28, 2021 (JP) ................................. 2021-215068

(51) Int. Cl.
*B60N 2/68* (2006.01)
*F16B 43/00* (2006.01)

(52) U.S. Cl.
CPC .............. *B60N 2/682* (2013.01); *F16B 43/00* (2013.01)

(58) Field of Classification Search
CPC ................................ B60N 2/682; F16B 43/00
See application file for complete search history.

(56) References Cited

U.S. PATENT DOCUMENTS

| 7,163,261 | B2* | 1/2007 | Kawashima | ....... B60N 2/42745 |
|---|---|---|---|---|
| | | | | 297/216.12 |
| 7,731,446 | B2* | 6/2010 | Prause | .................. B60N 2/1615 |
| | | | | 411/521 |
| 9,688,169 | B2* | 6/2017 | Contorbia | ............ B60N 2/4235 |
| 10,793,027 | B2* | 10/2020 | Osterhoff | ................. B60N 2/02 |
| 11,628,753 | B2* | 4/2023 | Kurokawa | ............... B60N 2/20 |
| | | | | 297/146 |
| 11,724,628 | B2* | 8/2023 | Kumazaki | ............... B60R 22/26 |
| | | | | 297/216.13 |

(Continued)

FOREIGN PATENT DOCUMENTS

JP 2012-26507 2/2012
JP 6035354 11/2016

*Primary Examiner* — Philip F Gabler
(74) *Attorney, Agent, or Firm* — Greenblum & Bernstein, P.L.C.

(57) ABSTRACT

Provided is a vehicle seat capable of providing its coupling structure with a vibration reducing function at a low cost. One aspect of the present disclosure provides a vehicle seat including a cushion frame. The cushion frame includes a first member and a second member, and a coupling structure coupling the first and second members to each other. The coupling structure includes a first collar having a cylindrical shape and fixed to the first member, a second collar having a cylindrical shape and inserted in the first collar, a bolt inserted through the second collar, a first elastic element arranged between the first collar and the second member in an axial direction of the bolt, and a second elastic element held between the first and second collars in a radial direction of the bolt. The first collar has an inner diameter changing along an axial direction of the first collar.

4 Claims, 9 Drawing Sheets (56) References Cited

U.S. PATENT DOCUMENTS

| | | | |
|---|---|---|---|
| 2014/0084657 A1* | 3/2014 | Edwards | B60N 2/366 297/354.1 |
| 2018/0023608 A1* | 1/2018 | Matsushima | F16F 1/3732 411/37 |
| 2021/0138945 A1* | 5/2021 | Yamaguchi | B60N 2/682 |
| 2022/0274513 A1* | 9/2022 | Höcks | B60N 2/0715 |

* cited by examiner

VEHICLE SEAT

CROSS-REFERENCE TO RELATED APPLICATIONS

This application claims the priority of Japanese Patent Application No. 2021-215068 filed on Dec. 28, 2021 with the Japan Patent Office and the entire disclosure of which is incorporated herein by reference.

BACKGROUND

The present disclosure relates to a vehicle seat.

In a cushion frame of the vehicle seat, a coupling structure with a bolt and a nut is used to couple two members to each other (see, Japanese Unexamined Patent Application Publication No. 2012-26507). In this coupling structure, an elastic element such as rubber is interposed, between two cylindrical bodies (that is, collars) that are coaxially arranged, to inhibit transmission of vibration.

SUMMARY

The above-mentioned coupling structure includes, at both ends of the elastic element, flange-like locking portions so as to inhibit the elastic element from falling off the collars. Thus, the elastic element cannot be easily inserted. Furthermore, a molding method involves complication such as requirement of multiple times of demolding during molding of the elastic element. As a result, a cost of manufacturing the vehicle seat increases.

In one aspect the present disclosure, it is preferred to provide a vehicle seat capable of providing its coupling structure with a vibration reducing function at a low cost.

One aspect of the present disclosure provides a vehicle seat comprising a seat cushion and a cushion frame supporting the seat cushion. The cushion frame includes a first member, a second member, and a coupling structure coupling the first member and the second member to each other. The coupling structure includes a first collar having a cylindrical shape and fixed to the first member, a second collar having a cylindrical shape and inserted in the first collar, a bolt inserted through the second collar, a nut screwed with the bolt, a first elastic element arranged between the first collar and the second member in an axial direction of the bolt, and a second elastic element held between the first collar and the second collar in a radial direction of the bolt. The first collar has an inner diameter changing along an axial direction of the first collar.

In the configuration as above, due to the inner diameter of the first collar changing in the axial direction of the first collar, a part of the first collar having the smallest inner diameter holds the second elastic element due to a frictional force. Thus, detachment of the second elastic element can be inhibited without providing the second elastic element with a flange-like locking portion. Accordingly, the second elastic element is easily inserted between the first collar and the second collar, and a cost of molding the second elastic element can be reduced.

In one aspect of the present disclosure, the first collar may include a contact portion in contact with the second elastic element in the radial direction of the bolt, and a facing portion spaced apart from and facing the second elastic element in the radial direction of the bolt. The contact portion may have a length, along the axial direction of the first collar, smaller than a length of the facing portion along the axial direction of the first collar. In the configuration as such, an area of contact between the first collar and the second elastic element is reduced. Thus, vibration characteristics of the second elastic element is inhibited from influencing on vibration characteristics of the first elastic element. Accordingly, vibration reducing performance of each of the first elastic element and the second elastic element can be improved.

In one aspect of the present disclosure, the first collar may include a tapered portion having an inner diameter continuously changing along the axial direction of the first collar. The configuration as such encourages facilitation of insertion work for the second elastic element.

In one aspect of the present disclosure, the first collar may include a step portion having an inner diameter discontinuously changing along the axial direction of the first collar. The configuration as such can enhance an effect of holding the second elastic element.

BRIEF DESCRIPTION OF THE DRAWINGS

Some example embodiments of the present disclosure will be described hereinafter with reference to the accompanying drawings, in which.

DETAILED DESCRIPTION OF EXEMPLARY EMBODIMENTS

1. First Embodiment

[1-1. Configuration]

Figure 1:
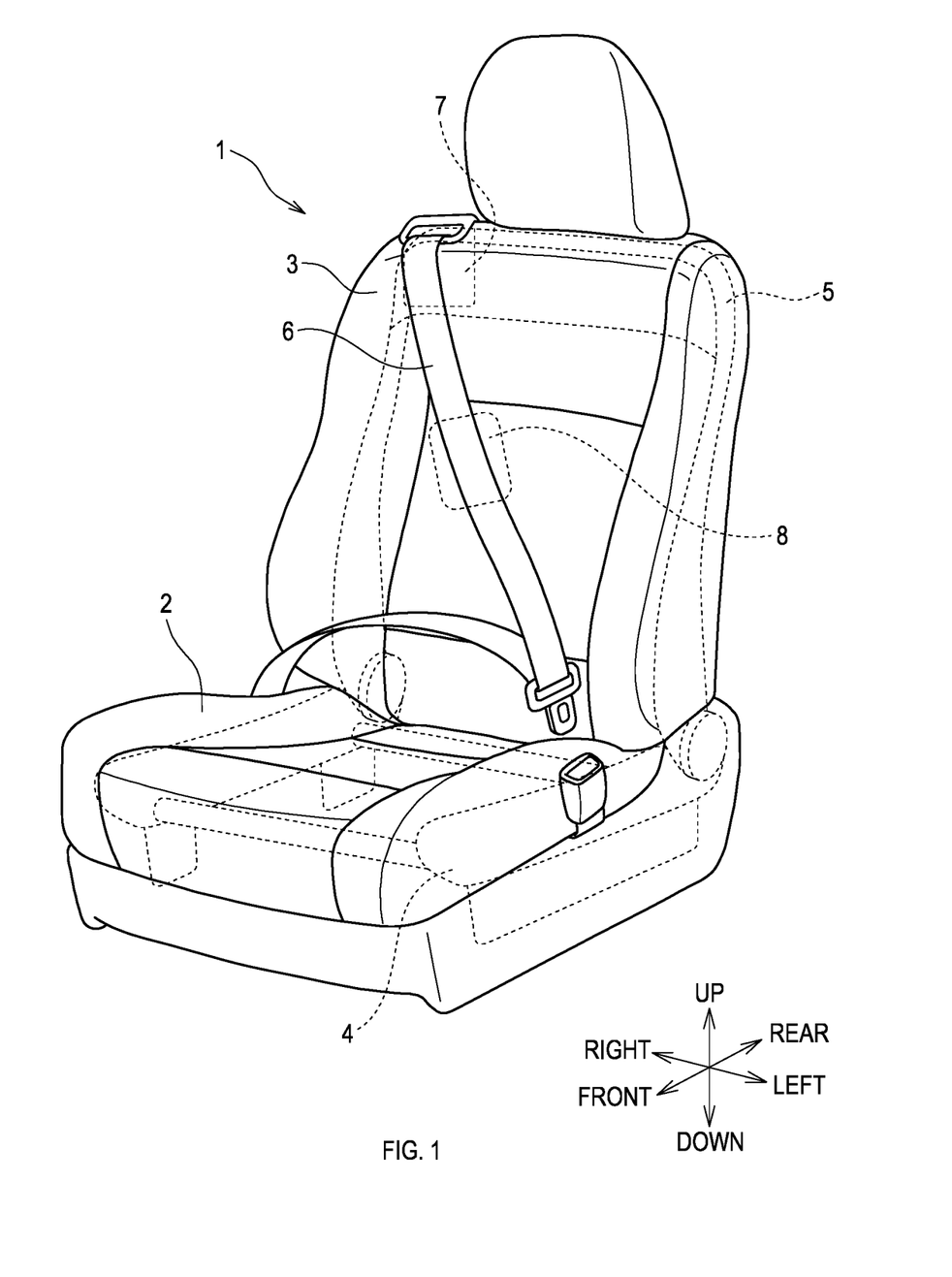
FIG. 1 is a schematic perspective view showing a vehicle seat of one embodiment.

There is provided a vehicle seat 1 as shown in FIG. 1. The vehicle seat 1 comprises a seat cushion 2, a seatback 3, a cushion frame 4, a back frame 5, a seat belt 6, a belt anchor 7, and a retractor 8.

The vehicle seat 1 is used as a seat in a passenger car. Note that directions in the following description and the drawings mean directions in a state where the vehicle seat 1 is installed in a vehicle (i.e., a passenger car). In this embodiment, a seat-width direction corresponds to a left-right direction of the vehicle, and a seat front side corresponds to the front of the vehicle.

The seat cushion 2 is a part to support the buttocks of an occupant. The seatback 3 is a part to support the back of the occupant. The cushion frame 4 supports the seat cushion 2. The back frame 5 supports the seatback 3.

The seat belt 6 is configured to extend from one shoulder of the seatback 3 (a right shoulder in the present embodiment) across the seatback 3 in the seat-width direction toward an end of the seat cushion 2 in a seat-width direction (a left side end in the present embodiment), whereby the occupant wears the belt.

The belt anchor 7 is a guide to discharge the seat belt 6 from the inside of the seatback 3 and thus to pull back the seat belt 6 into the seatback 3. The belt anchor 7 is attached to the back frame 5.

The retractor 8 is a device to wind up the seat belt 6. The retractor 8 is held by the back frame 5 inside the seatback 3. The seat belt 6 extends between the retractor 8 and the belt anchor 7 inside the seatback 3.

<Cushion Frame>

Figure 2:
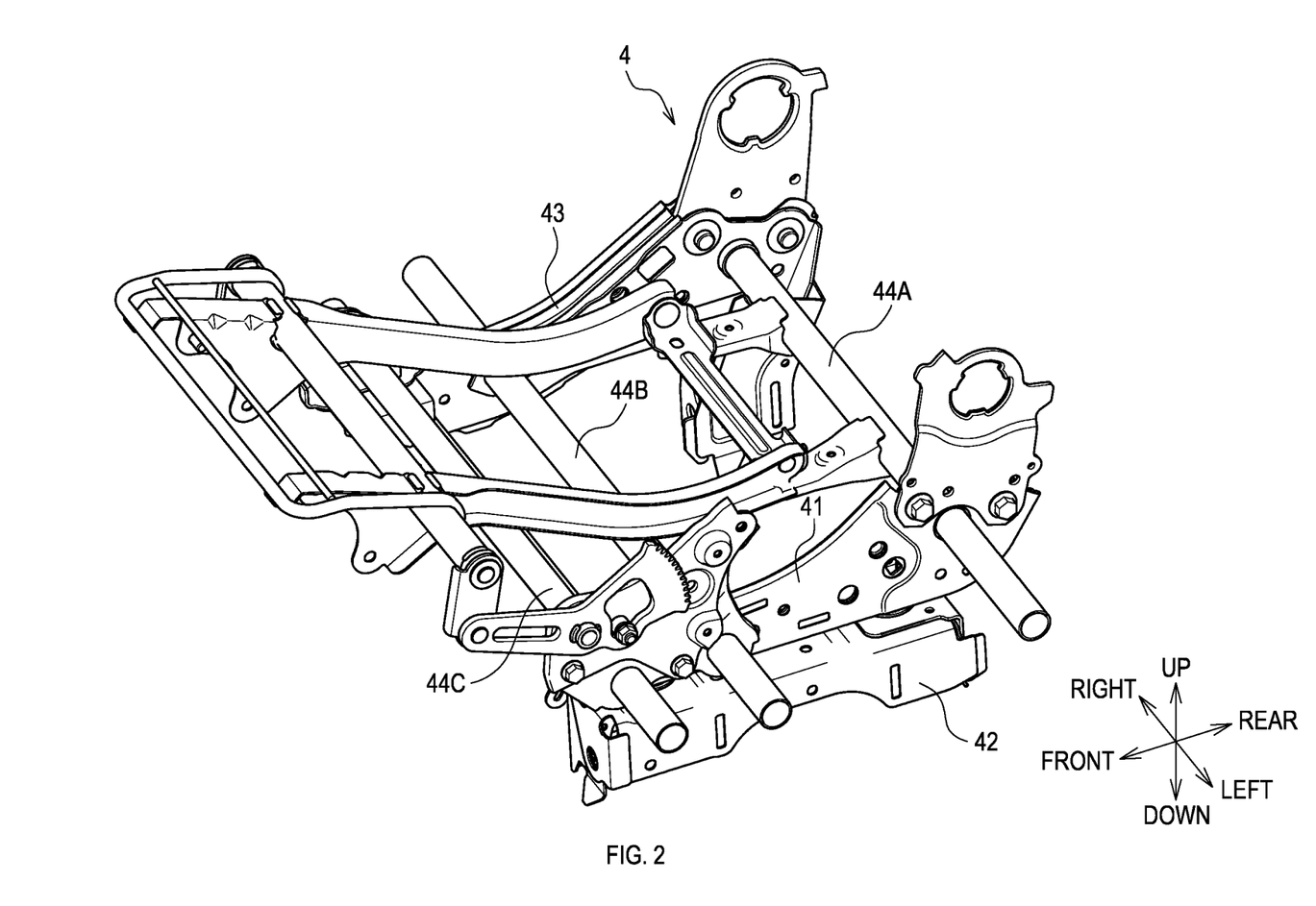
FIG. 2 is a schematic perspective view of a cushion frame of the vehicle seat in FIG. 1.

The cushion frame 4 includes, as shown in FIG. 2, a first side frame 41, a leg 42, a second side frame 43, and multiple coupling rods 44A, 44B, 44C.

The first side frame 41 and the second side frame 43 each extend in a front-rear direction, and are arranged apart from each other in the seat-width direction. The leg 42 is coupled to a lower end of the first side frame 41. Each of the multiple coupling rods 44A, 44B, 44C couples the first side frame 41 and the second side frame 43 to each other in the seat-width direction.

Figure 3:
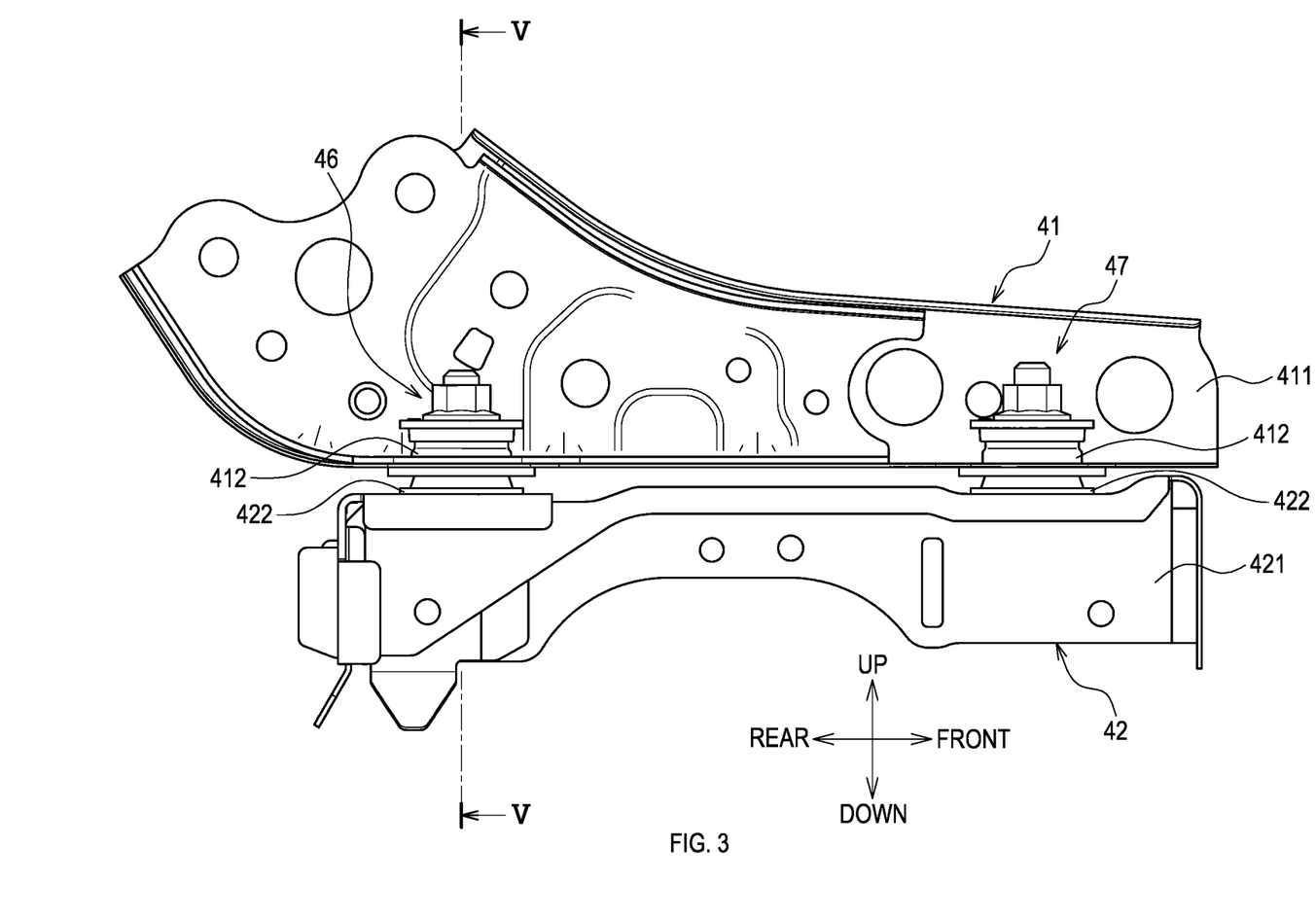
FIG. 3 is a schematic side view showing a part of the cushion frame in FIG. 2.

As shown in FIG. 3, the first side frame 41 and the leg 42 are coupled in an up-down direction by a first coupling structure 46 and a second coupling structure 47.

Figure 4:
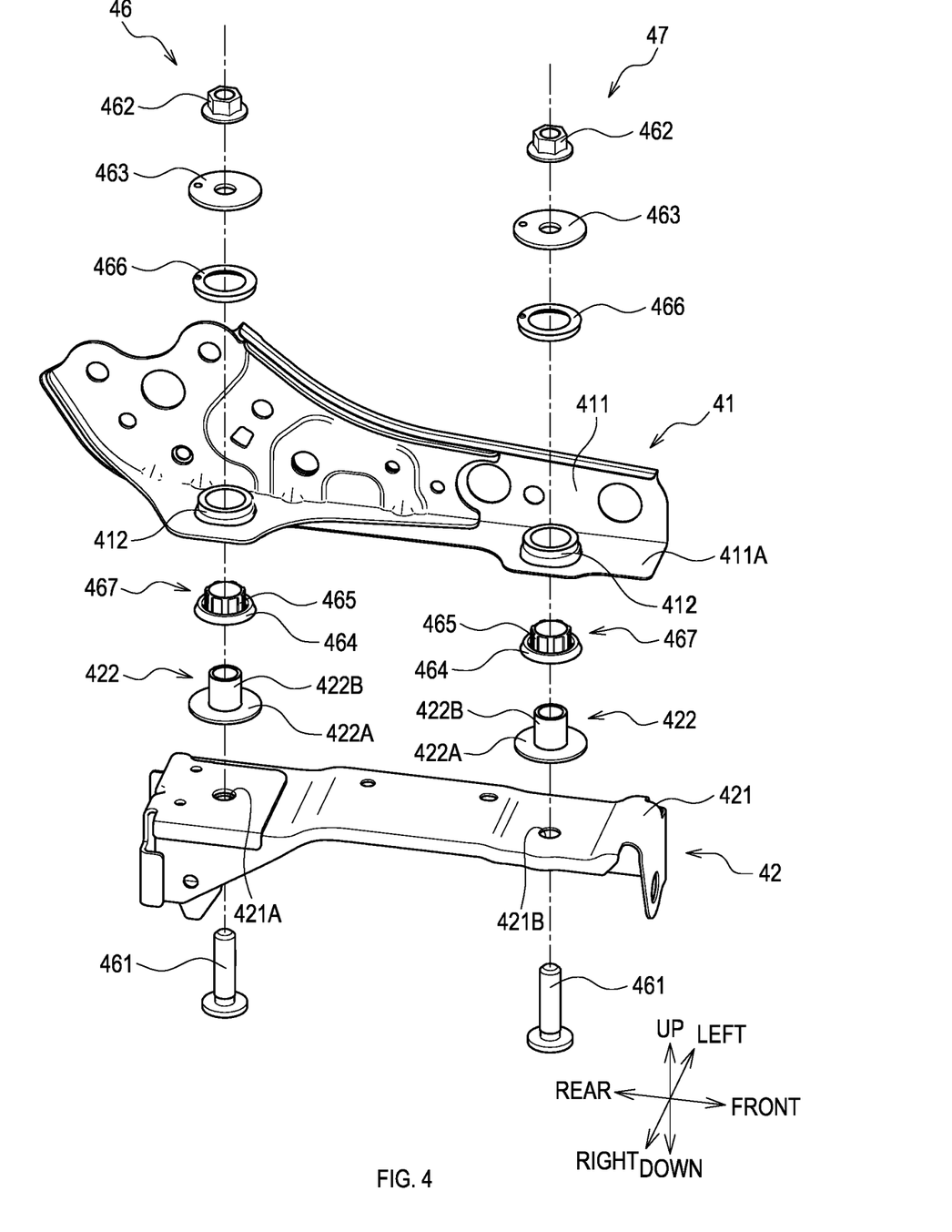
FIG. 4 is a schematic exploded perspective view of a first coupling structure and a second coupling structure of the cushion frame in FIG. 2.

As shown in FIG. 4, the first side frame 41 includes a side panel 411. The leg 42 includes a leg panel 421. The leg panel 421 includes a first opening 421A and a second opening 421B through which a bolt 461 is inserted.

<First Coupling Structure>

The first coupling structure 46 includes a first collar 412, a second collar 422, the bolt 461, a nut 462, an auxiliary member 463, a first elastic element 464, a second elastic element 465, and a third elastic element 466. The first elastic element 464 and the second elastic element 465 form an elastic member 467.

The first collar 412 is a cylindrical member fixed, for example, welded to a bottom wall 411A of the side panel 411 that extends in a seat front-rear direction (i.e., the bottom wall 411A having a plate surface intersecting the up-down direction).

The first collar 412 penetrates through the bottom wall 411A in a thickness direction. The second collar 422 and the bolt 461 are inserted through the first collar 412. A detailed shape of the first collar 412 will be described later.

The second collar 422 is a cylindrical member arranged on a top surface of the leg panel 421 so that a hollow part thereof communicates with the first opening 421A. The second collar 422 includes a flange portion 422A having a disk-like shape and being in contact with the leg panel 421, and a main body 422B having a cylindrical shape and extending upward from the flange portion 422A (i.e., the cylindrical main body 422B extends toward the first side frame 41).

The main body 422B of the second collar 422 is inserted inside the first collar 412 to thereby penetrate through the first side frame 41. An upper end of the main body 422B in an axial direction is located above an upper end of the first collar 412 in an axial direction. The bolt 461 is inserted through the second collar 422. Furthermore, the second collar 422 is not directly fixed to the leg panel 421.

The bolt 461 is inserted through the first side frame 41 and the leg 42. Specifically, the bolt 461 is inserted through the leg panel 421, the second collar 422, the elastic member 467, the first collar 412, the third elastic element 466, the auxiliary member 463, and the nut 462.

The head of the bolt 461 is located on an opposite side of the first side frame 41 across the leg 42 (i.e., the head of the bolt 461 is below the leg 42). The bolt 461 is inserted from a leg 42 side during the assembly of the cushion frame 4. In this embodiment, the head of the bolt 461 is in contact with a lower surface of the leg panel 421.

The nut 462 is screwed to the bolt 461. The nut 462 is arranged at a position where the first side frame 41 is interposed between the nut 462 and the leg 42 in an axial direction of the bolt 461 (i.e. the nut 462 is above the first side frame 41). In this embodiment, the nut 462 is in contact with an upper surface of the auxiliary member 463.

The auxiliary member 463 is a disk-shaped member with an opening in the center thereof so as to have the bolt 461 inserted therethrough. The auxiliary member 463 has an inner diameter smaller than an inner diameter of the main body 422B of the second collar 422. The auxiliary member 463 has an outer diameter larger than an outer diameter of the third elastic element 466.

Figure 5:
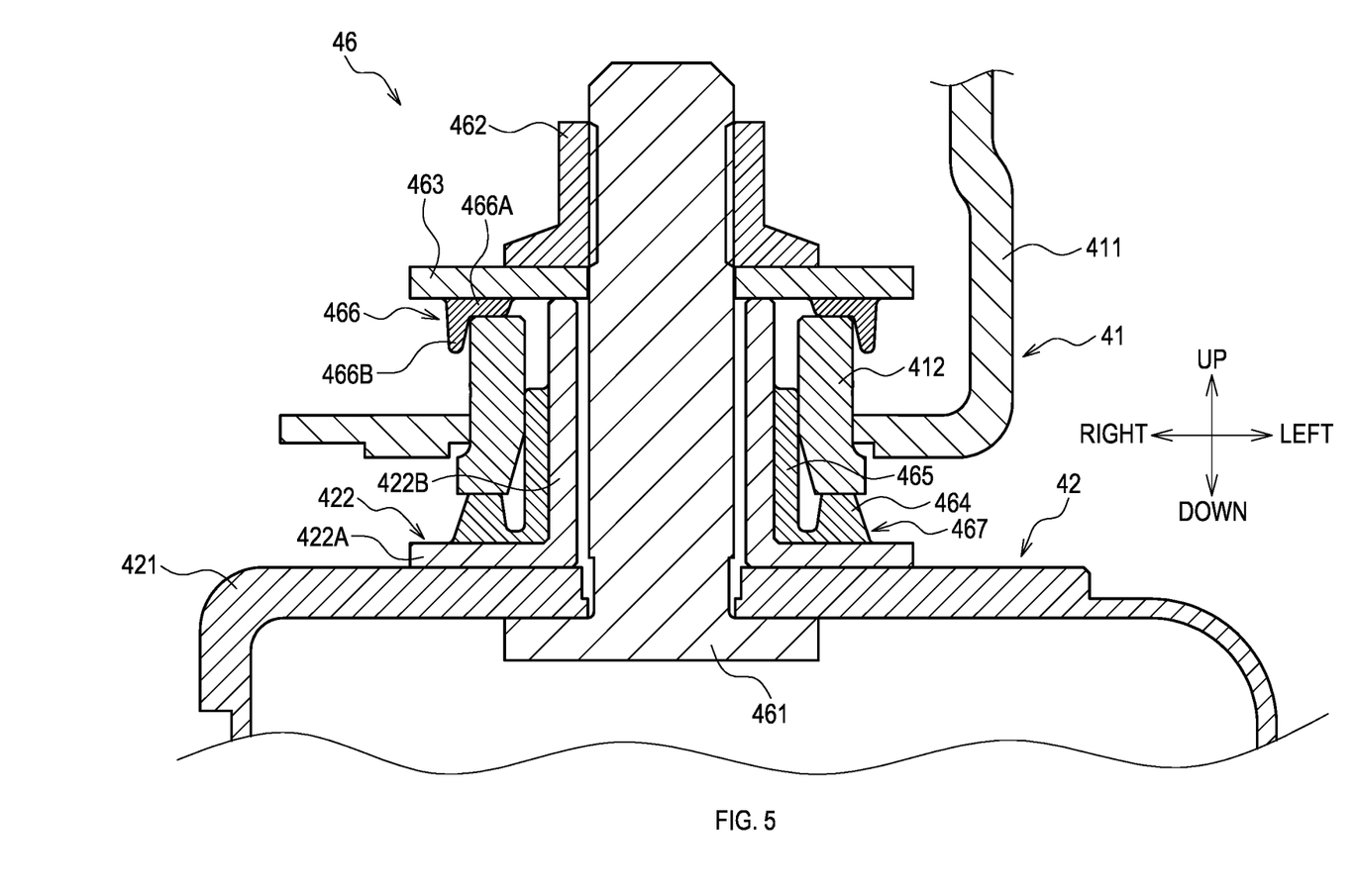
FIG. 5 is a schematic end view of a sectioned part taken along a V-V line in FIG. 3.

As shown in FIG. 5, the auxiliary member 463 is arranged so as to hold the second collar 422 between the auxiliary member 463 and the leg 42 in the axial direction of the bolt 461. Furthermore, between the auxiliary member 463 and the leg 42, the elastic member 467, the side panel 411, the first collar 412, and the third elastic element 466 are arranged. A lower surface of the auxiliary member 463 is in contact with an upper end of the main body 422B of the second collar 422 in an axial direction of the main body 422B.

The first elastic element 464 is a cylindrical member through which the bolt 461 is inserted. The material of the first elastic element 464 is rubber, for example. The first elastic element 464 is arranged between the first collar 412 and the leg 42 in the axial direction of the bolt 461.

Specifically, the first elastic element 464 is arranged between a lower end of the first collar 412 and the flange portion 422A of the second collar 422 in the axial direction the bolt 461, and is in contact with the lower end of the first collar 412 and the flange portion 422A.

The first elastic element 464 is compressed in the axial direction of the bolt 461 by the flange portion 422A of the second collar 422 and the first collar 412 due to the fastening of the bolt 461 and the nut 462. The first elastic element 464 completely encircles the bolt 461 in a circumferential direction of the bolt.

The second elastic element 465 is a cylindrical member through which the bolt 461 is inserted. The second elastic element 465 is integrally formed with the first elastic element 464. In other words, the first coupling structure 46 includes the elastic member 467 in which the first elastic element 464 and the second elastic element 465 are integrated.

The second elastic element 465 is connected, at a lower end in an axial direction thereof, to the first elastic element 464 in a radial direction of the bolt 461. The elastic member 467 is fixed to the second collar 422 by, for example, adhesion.

The second elastic element 465 is interposed between the first collar 412 and the second collars 422 in the radial direction of the bolt 461. Specifically, an inner circumferential surface of the second elastic element 465 is in contact with an outer circumferential surface of the main body 422B of the second collar 422. An outer circumferential surface of the second elastic element 465 is in contact with an inner circumferential surface of the first collar 412. The second elastic element 465 is inserted through an interior space of the first collar 412 while being attached to the second collar 422.

The second elastic element 465 includes, in an axial direction thereof, an upper end located above an upper end of the first elastic element 464. In other words, the second elastic element 465 has a length, in an axial direction thereof, longer than a length in an axial direction of the first elastic element 464. Furthermore, the upper end of the second elastic element 465 in the axial direction is spaced apart from the auxiliary member 463.

Figure 6A:
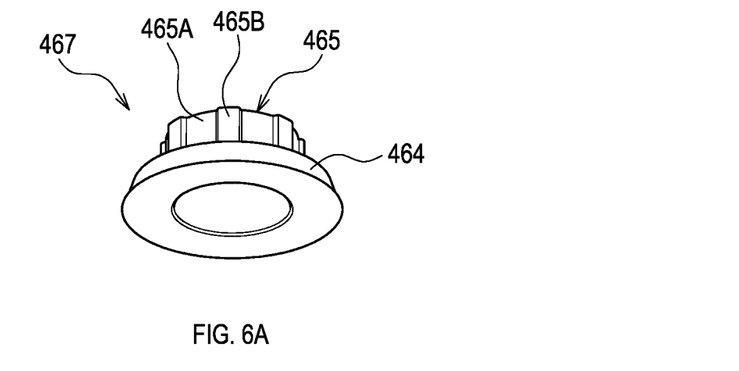
FIG. 6A is a schematic perspective view of an elastic member of the first coupling structure in FIG. 4.

As shown in FIG. 6A, the second elastic element 465 includes a holder 465A and multiple convex parts 465B. The holder 465A is a cylindrical part. An outer circumferential surface of the holder 465A is not in contact with the first collar 412.

The multiple convex parts 465B are arranged at fixed intervals in a circumferential direction of the holder 465A. Each convex part 465B is a part protruding outwardly from the outer circumferential surface of the holder 465A in a radial direction of the holder 465A. The convex part 465B is compressed by the second collar 422 and the first collar 412 in the radial direction of the holder 465A.

The convex part 465B extends in the axial direction of the second elastic element 465 from a lower end to an upper end of the second elastic element 465. The thickness of the convex part 465B is fixed along the axial direction of the second elastic element 465. Furthermore, it is preferred that the number of the convex part 465B is odd. Due to the number of the convex part 465B being odd, the second elastic element 465 can be easily centered, resulting in improvement of an effect to reduce a vibration.

Figure 6B:
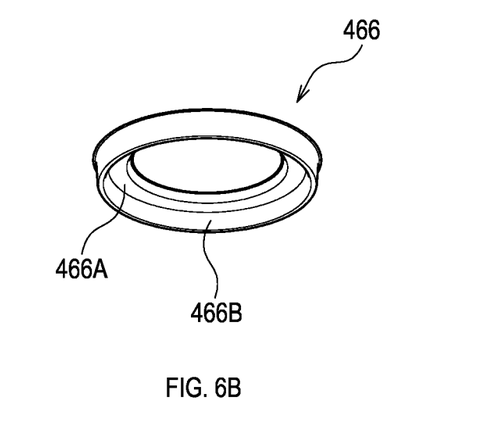
FIG. 6B is a schematic perspective view of a third elastic element of the first coupling structure in FIG. 4.

The third elastic element 466 shown in FIG. 6B is an annular member through which the bolt 461 is inserted. The material of the third elastic element 466 is rubber, for example. As shown in FIG. 5, the third elastic element 466 is arranged between the first collar 412 and the auxiliary member 463 in the axial direction of the bolt 461, and is in contact with the first collar 412 and the auxiliary member 463. The third elastic element 466 is fixed to the lower surface of the auxiliary member 463 by adhesion, for example.

The third elastic element 466 includes a base 466A and a guide portion 466B. The base 466A is compressed in the axial direction of the bolt 461 by the upper end of the first collar 412 in the axial direction and the lower surface of the auxiliary member 463 due to the fastening of the bolt 461 and the nut 462.

The guide portion 466B protrudes from the base 466A in the axial direction of the first collar 412, and surrounds the first collar 412 at a position radially outward of the first collar 412. Specifically, the guide portion 466B is a cylindrical part protruding downward from a lower surface of the base 466A.

The guide portion 466B has an inner circumferential surface in contact with an outer circumferential surface of the first collar 412. That is, the first collar 412 is inserted into the guide portion 466B. The base 466A and the guide portion 466B completely encircle the bolt 461 in the circumferential direction of the bolt.

The first collar 412 is held between the first elastic element 464 and the third elastic element 466 in the axial direction of the bolt 461. Thus, between the auxiliary member 463 and the flange portion 422A of the second collar 422, there is no gap communicating with the inside of the first collar 412. In other words, the interior space of the first collar 412 is sealed by the auxiliary member 463, the third elastic element 466, the first elastic element 464, and the second collar 422.

The third elastic element 466 has a spring constant larger than a spring constant of the first elastic element 464 (i.e., the elastic member 467). That is, the third elastic element 466 is firmer and less deformable than the first elastic element 464. Thus, the third elastic element 466 exhibits better performance of regulating input of a load than the first elastic element 464. The third elastic element 466 also exhibits an effect of reducing abnormal noise caused by vibration in the first coupling structure 46.

<Shape of First Collar>

Figure 7:
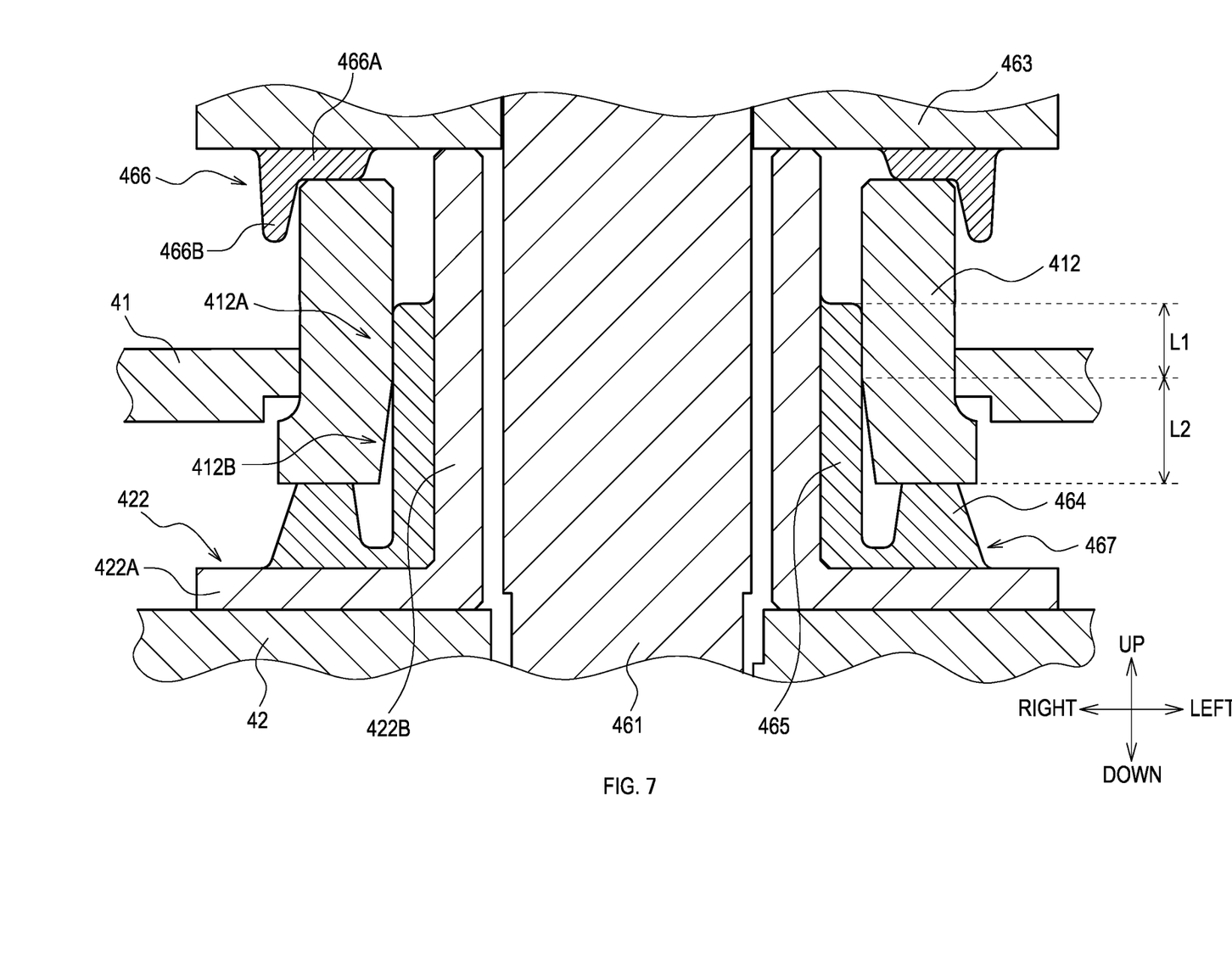
FIG. 7 is a schematic enlarged end view of a sectioned part showing the vicinity of a first collar in FIG. 5.

As shown in FIG. 7, the first collar 412 has an inner diameter changing along the axial direction thereof. Specifically, the first collar 412 includes a contact portion 412A and a facing portion 412B.

The contact portion 412A is a part in contact with the protrusion 465B of the second elastic element 465 in the radial direction of the bolt 461. The contact portion 412A and the second collar 422 compress the second elastic element 465. The contact portion 412A has an inner diameter fixed along the axial direction of the first collar 412. Within the first collar 412, the contact portion 412A is a part having the smallest inner diameter.

The facing portion 412B is a part spaced apart from and facing the second elastic element 465 in the radial direction of the bolt 461. The facing portion 412B is arranged downward of the contact portion 412A. That is, the facing portion 412B is arranged continuously at a position closer to the first elastic element 464 than the contact portion 412A is in the axial direction of the bolt 461.

The facing portion 412B is a tapered part having an inner diameter continuously changing along the axial direction of the first collar 412. Specifically, the inner diameter of the facing portion 412B increases such that a distance of the facing portion 412B from the second elastic element 465 increases downward.

The facing portion 412B has an interior space having a diameter increasing toward an end (i.e., a lower end) thereof in which the second elastic element 465 is inserted. Due to the facing portion 412B being a tapered portion as such, facilitation of insertion work for the second elastic element 465 is encouraged.

The contact portion 412A has a length L1, along the axial direction of the first collar 412, smaller than a length L2 of the facing portion 412B along the axial direction of the first collar 412. The length L1 of the contact portion 412A along the axial direction of the first collar 412 is preferably one-thirds of the total axial length of the first collar 412 or larger, and one-seconds of the total axial length of the first collar 412 or smaller.

Figure 8A:
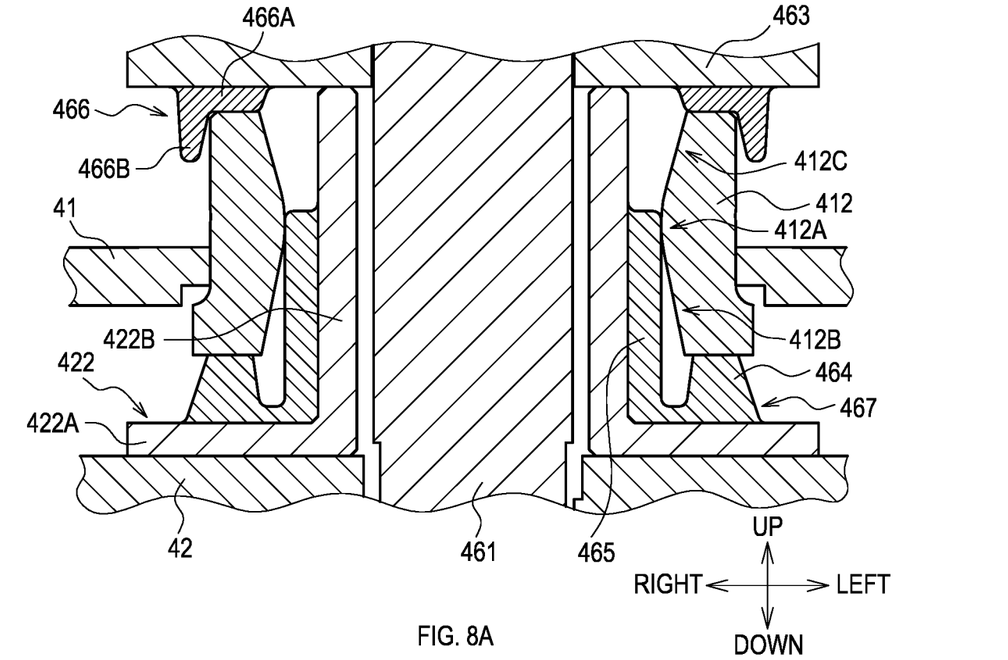
FIG. 8A is a schematic enlarged end view of a sectioned part showing the vicinity of a first collar according to an embodiment different from the embodiment in FIG. 5.

As shown in FIG. 8A, the first collar 412 may further include an upper-side tapered portion 412C having an inner diameter that changes upward in a continuously increasing manner. A part of the upper side tapered portion 412C faces the second elastic element 465 in the radial direction of the bolt 461. In an example in FIG. 8A, the contact portion 412A of the first collar 412 is held between the facing portion 412B (i.e., a lower-side tapered portion) and the upper-side tapered portion 412C in the axial direction of the first collar 412.

Figure 8B:
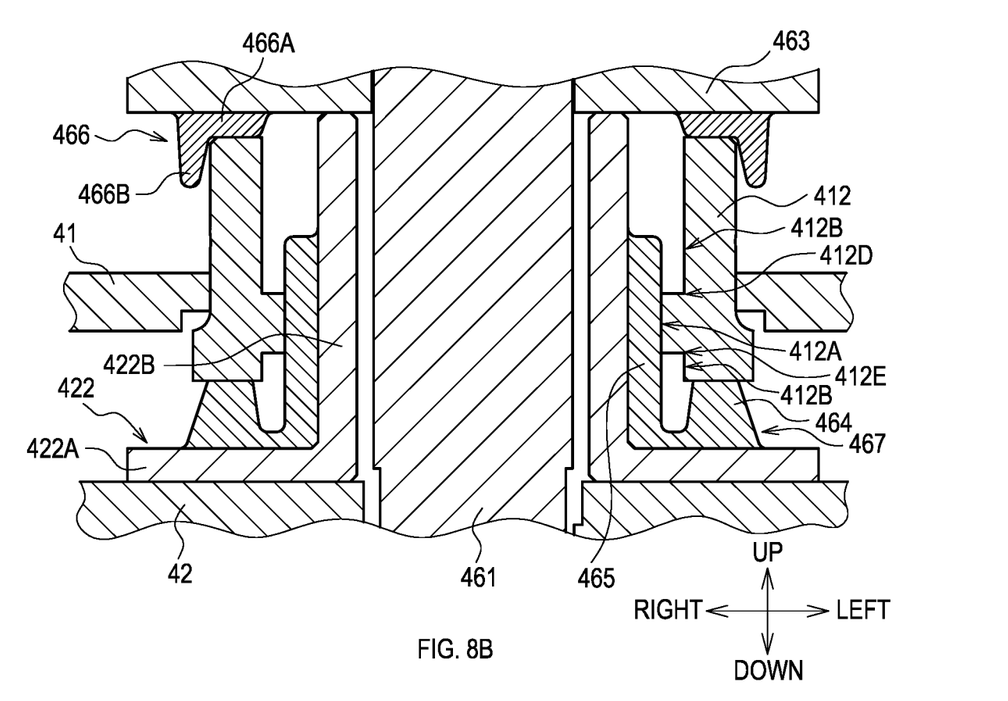
FIG. 8B is a schematic enlarged end view of a sectioned part showing the vicinity of a first collar according to an embodiment different from the embodiment in FIG. 5.

Furthermore, as shown in FIG. 8B, the first collar 412 may include, in place of the tapered portion, a first step portion 412D and a second step portion 412E, each of which has an inner diameter discontinuously changing along the axial direction of the first collar 412. The first step portion 412D and the second step portion 412E are provided to respective parts connecting the contact portion 412A and two facing portions 412B to each other.

In an example in FIG. 8B, the two facing portions 412B (i.e., an upper-side facing portion 412B and a lower-side facing portion 412B) are arranged individually in an upper side and a lower side of the contact portion 412A. The contact portion 412A is arranged at a position closer to the first elastic element 464 than the upper-side facing portion 412B is in the axial direction of the bolt 461. The inner diameter of each facing portion 412B is fixed along the axial direction of the bolt 461. Arranging the first step portion 412D and the second step portion 412E as such can enhance an effect of holding the second elastic element 465.

Figure 9:
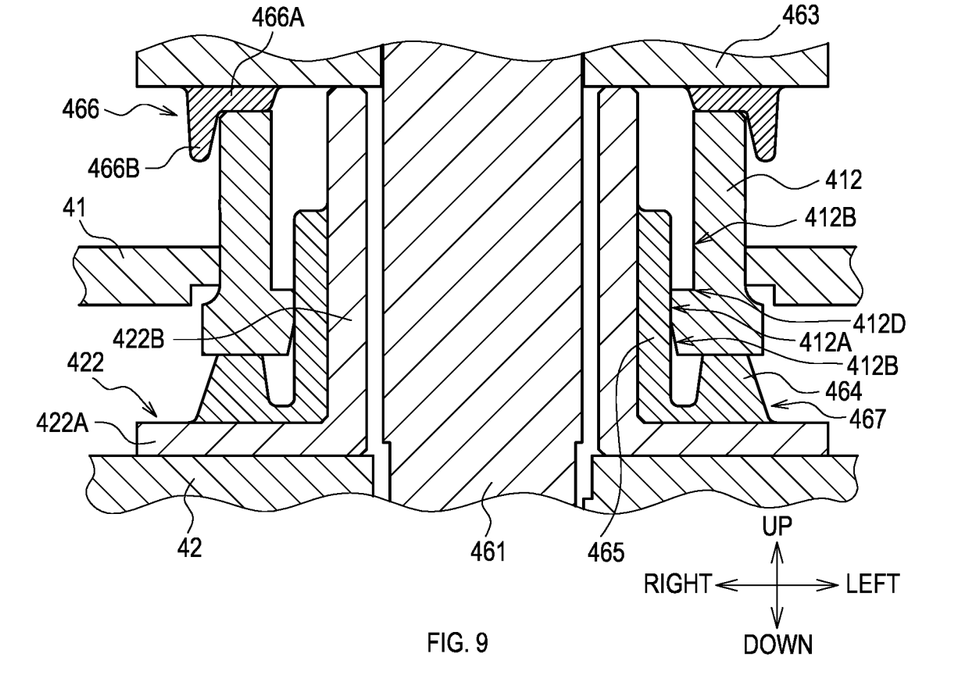
FIG. 9 is a schematic enlarged end view of a sectioned part showing the vicinity of a first collar according to an embodiment different from the embodiment in FIG. 5.

Furthermore, as shown in FIG. 9, the lower-side facing portion 412B in FIG. 8B may be configured with a tapered portion. The lower-side facing portion 412B has an inner diameter increasing such that a distance thereof from the second elastic element 465 increases downward.

<Second Coupling Structure>

As in the case of the first coupling structure 46, the second coupling structure 47 shown in FIG. 4 includes the first collar 412, the second collar 422, the bolt 461, the nut 462, the auxiliary member 463, the elastic member 467 (i.e., the first elastic element 464 and the second elastic element 465), and the third elastic element 466.

The second coupling structure 47 couples, at a position closer to the seat front side than the first coupling structure 46 is, the first side frame 41 and the leg 42 to each other in the up-down direction. The axial direction of the bolt 461 in the second coupling structure 47 is the same as the axial direction of the bolt 461 in the first coupling structure 46. Furthermore, since the second coupling structure 47 has other configurations similar to those in the first coupling structure 46, descriptions of the common configurations will be omitted.

[1-2. Effects]

According to the embodiment described above, the following effects can be obtained.

(1a) Due to the inner diameter of the first collar 412 changing in the axial direction of the first collar 412, the part of the first collar 412 having the smallest inner diameter holds the second elastic element 465 due to a frictional force. Thus, detachment of the second elastic element 465 can be inhibited without providing the second elastic element 465 with a flange-like locking portion. Accordingly, the second elastic element 465 is easily inserted between the first collar 412 and the second collar 422, and a cost of molding the second elastic element 465 can be reduced.

(1b) Due to the length L1 of the contact portion 412A being smaller than the length L2 of the facing portion 412B, an area of contact between the first collar 412 and the second elastic element 465 is reduced. Thus, vibration characteristics of the second elastic element 465 is inhibited from influencing on vibration characteristics of the first elastic element 464. Accordingly, vibration reducing performance of each of the first elastic element 464 and the second elastic element 465 can be improved.

2. Other Embodiments

Although the embodiment of the present disclosure has been described above, it goes without saying that the present disclosure is not limited to the above embodiment and can take various forms.

(2a) In the vehicle seat of the above-described embodiment, a position to provide the coupling structure is not limited to the above-described position. For example, the coupling structure may be provided to second side frame.

Components coupled by the coupling structure are not limited to the side frame and the leg. For example, the coupling structure may couple the side frame and a slide rail to each other. In addition, a coupling direction of the coupling structure is not limited to the up-down direction and may be a direction intersecting the up-down direction (e.g., a horizontal direction).

(2b) In the vehicle seat of the above-described embodiment, the first elastic element and the third elastic element do not necessarily have the cylindrical shape or the annular shape. For example, the first elastic element and the third elastic element may have a cutout in a part of a circumferential surface thereof. Furthermore, the coupling structure does not necessarily include the auxiliary member and the third elastic element.

(2c) In the vehicle seat of the above-described embodiment, the second elastic element is not necessarily integrated with the first elastic element and may be a member separated from the first elastic element.

(2d) In the vehicle seat of the aforementioned embodiment, the bolt may be inserted from an auxiliary member side (i.e., an upper side) during the assembly of the cushion frame. Furthermore, the auxiliary member may be integrated with the nut or the bolt. For example, the auxiliary member in contact with the second elastic element may be provided in a washer part of the nut or the head of the bolt.

(2e) The vehicle seat of the above-described embodiment can be applied to seats used in automobiles other than passenger cars, and also applied to seats used in vehicles other than the automobiles, such as railway vehicles, ships, and aircrafts.

(2f) A function served by a single element in any of the above-described embodiments may be achieved by a plurality of elements, or a function served by a plurality of elements may be achieved by a single element. In addition, a part of the configurations of the aforementioned embodiments may be omitted. Furthermore, at least a part of the configurations of the aforementioned embodiments may be added to or replaced with the configurations of other aforementioned embodiments. It should be noted that all modes included in the technical idea specified from the wording described in the claims are embodiments of the present disclosure.

What is claimed is:

1. A vehicle seat comprising:
    a seat cushion; and
    a cushion frame supporting the seat cushion;
    wherein the cushion frame includes:
        a first member;
        a second member; and
        a coupling structure coupling the first member and the second member to each other,
    wherein the coupling structure includes:
        a first collar having a cylindrical shape, the first collar being fixed to the first member;
        a second collar having a cylindrical shape, the second collar being inserted in the first collar;
        a bolt inserted through the second collar;
        a nut screwed with the bolt;
        a first elastic element arranged between the first collar and the second member in an axial direction of the bolt; and a second elastic element held between the first collar and the second collar in a radial direction of the bolt, and wherein the first collar has an inner diameter changing in an axial direction of the first collar.

2. The vehicle seat according to claim 1, wherein the first collar includes:

a contact portion in contact with the second elastic element in the radial direction of the bolt; and a facing portion spaced apart from and facing the second elastic element in the radial direction of the bolt, and wherein the contact portion has a length, along the axial direction of the first collar, smaller than a length of the facing portion along the axial direction of the first collar.

3. The vehicle seat according to claim 1, wherein the first collar includes a tapered portion having an inner diameter continuously changing along the axial direction of the first collar.

4. The vehicle seat according to claim 1, wherein the first collar includes a step portion having an inner diameter discontinuously changing along the axial direction of the first collar.

* * * * *